US010649472B2

(12) United States Patent
Gearheart et al.

(10) Patent No.: US 10,649,472 B2
(45) Date of Patent: May 12, 2020

(54) TUBING SYSTEM

(71) Applicant: TSE INDUSTRIES, INC., Clearwater, FL (US)

(72) Inventors: David Gearheart, Palm Harbor, FL (US); Robert Klingel, Jr., St. Petersburg, FL (US)

(73) Assignee: TSE INDUSTRIES, INC., Clearwater, FL (US)

( * ) Notice: Subject to any disclaimer, the term of this patent is extended or adjusted under 35 U.S.C. 154(b) by 249 days.

(21) Appl. No.: 15/645,474

(22) Filed: Jul. 10, 2017

(65) Prior Publication Data

US 2019/0011937 A1    Jan. 10, 2019

(51) Int. Cl.
| | |
|---|---|
| *G05D 7/06* | (2006.01) |
| *F15B 13/08* | (2006.01) |
| *F16L 41/03* | (2006.01) |
| *F16L 39/00* | (2006.01) |

(52) U.S. Cl.
CPC ....... *G05D 7/0652* (2013.01); *F15B 13/0817* (2013.01); *F16L 39/00* (2013.01); *F16L 41/03* (2013.01)

(58) Field of Classification Search
CPC ......... F16L 39/00; F16L 41/03; F16L 41/021; F16L 39/06; F16L 41/02; F16L 41/025; F15B 13/0817; F15B 13/0814; F15B 13/0807; G05D 7/0652; B29L 2031/24
USPC ........... 285/125.1, 126.1, 130.1, 133.11, 260
See application file for complete search history.

(56) References Cited

U.S. PATENT DOCUMENTS

| | | | | |
|---|---|---|---|---|
| 3,526,419 A | * | 9/1970 | Saguchi | ................ F16L 15/006 285/125.1 |
| 3,739,804 A | * | 6/1973 | Dubreuil | ................. F16L 41/03 137/269 |
| 3,881,830 A | * | 5/1975 | Kato | ....................... F16L 41/03 403/171 |

(Continued)

FOREIGN PATENT DOCUMENTS

| | | |
|---|---|---|
| DE | 3131336 A1 | 2/1983 |
| FR | 3044381 A1 | 6/2017 |

(Continued)

OTHER PUBLICATIONS

European Search Report Application No. 18179773.9; dated Nov. 29, 2018; 6 pages.

*Primary Examiner* — Zachary T Dragicevich
*Assistant Examiner* — William S. Choi
(74) *Attorney, Agent, or Firm* — Brooks Kushman P.C.

(57) ABSTRACT

A system for establishing a fluid path between a plurality of tubes includes a manifold and a plurality of caps. The manifold defines an internal cavity and a plurality of orifices that access the cavity. Each of the plurality of caps are secured to an end of a respective tube of the plurality of tubes. Each cap defines a central orifice that is in fluid communication with the respective tube. Each cap has a tapered protrusion extending away from the end of the respective tube. The caps are disposed within the internal cavity such that the respective tube extends through a respective orifice of the plurality of orifices and outward from the manifold. The tapered protrusions of adjacent caps interact with each other to position each cap to form a seal with other caps having a central orifice such that the central orifices are in fluid communication with each other.

19 Claims, 4 Drawing Sheets

(56) References Cited

U.S. PATENT DOCUMENTS

| | | |
|---|---|---|
| 6,290,265 B1 | 9/2001 | Warburton-Pitt et al. |
| 9,259,563 B2 | 2/2016 | Klingel, Jr. et al. |
| 2016/0200038 A1* | 7/2016 | Gagne .................... F16L 47/32 285/131.1 |

FOREIGN PATENT DOCUMENTS

| | | | | |
|---|---|---|---|---|
| GB | 829182 A | | 3/1960 | |
| WO | WO-2016079083 A1 | * | 5/2016 | ....... B29C 45/14598 |
| WO | 2016109805 A1 | | 7/2016 | |

\* cited by examiner

TUBING SYSTEM

BACKGROUND OF THE INVENTION

1. Field of the Invention

The invention is directed to a connector system for use with plastic tubing.

2. Description of the Related Art

Plastic tubing has been available for use for many years now. Often, lengths of plastic-tubing must be connected, either end-to-end, or in a branched form, for example in a "cross" or "T" form. For such uses, metal or plastic connectors having circumferential ridges have been used. Following insertion into the bore of the tubing, a metal clamp is tightened to produce a leak free seal. For tubing of relatively small diameters, problems arise because of inadequate sealing by the clamps. Use of specially designed crimp-on fittings may partially eliminate the problem, but then require special crimping tools. Assembly and disassembly are time consuming and laborious.

Over the past few decades, bioreactors have proliferated. Bioreactors are used, e.g., to produce genetically engineered proteins, to produce vaccines, and to use microorganisms to produce a variety of organic chemicals ranging from small, simple molecules to highly complex molecules, often with multiple asymmetric centers. Such complex molecules are often used to provide complex building blocks for further reaction to form pharmaceutical products. Bioreactors often have a myriad of inlets or connections to supply substances such as water, oxygen (or air), nutrient solutions, etc., and to remove product. In many cases, large banks of bioreactors are used, requiring a great many interconnections of the various supply lines. Early on, most of these lines were constructed of stainless steel tubing. Such tubing is expensive and difficult to work with. The high cost of stainless steel tubing dictated reuse between reactor campaigns, but the cost of disconnecting, cleaning, and reconnecting was also very high.

Today, plastic tubing has largely supplanted stainless steel tubing in many production uses, including the biopharmaceutical industry. However, it was rapidly found that the conventional tubing connectors described at the outset were unsuitable, partially for the reasons previously expressed. The art has thus actively sought improved methods of connecting a plurality of tubes, particularly plastic tubes.

One solution to this problem is disclosed in U.S. Pat. No. 9,259,563. This patent discloses the use of overmolded manifolds to connect a plurality of plastic tubes. In this method, a metal rod is inserted into the ends of tubing to be connected, and the tubing is then placed in an injection mold, and an appropriate manifold molded over the tubing ends. The metal rods, which are used to prevent tubing collapse at the injection molding pressure, are then removed. This system is believed to have had large commercial success. However, this system is also relatively expensive, due to the necessity of having an injection molding machine, and different dies for each different variety of manifold. The necessity of having different dies for different connection arrangements, tubing sizes, etc. limits the connection possibilities. For example, in a simple six tubing manifold, if one tube is increased in diameter, a different die would have to be procured as compared to a manifold where all tubes are of the same size. A further problem is that the length of tubing which can be connected is very limited, as the rods are difficult to remove, having to be worked out of the tubing manually, or in some cases, blown out of the tube by high pressure air or liquid. The short lengths of tubing then require end-to-end connection to provide a long run of tubing.

It would be desirable to provide a tubing connection system which does not require injection molding using a multiplicity of dies, which can employ long lengths of tubing without requiring additional connectors, and which is not laborious or time consuming to connect or disconnect.

SUMMARY OF THE INVENTION

It has now been surprisingly and unexpectedly discovered that tubing, especially plastic tubing, can be connected in a flexible manner by employing a hollow manifold having a plurality of orifices in walls thereof, in conjunction with tubing which has a hollow cap on its manifold end, the cap having a structure such that upon inserting a plurality of such capped tubes into the manifold, the caps seal against each other, providing fluid communication between the plurality of tubes through the hollow endcaps. "Dummy" caps can be inserted into the manifold to provide the necessary seal when some orifices are to be free of tubing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
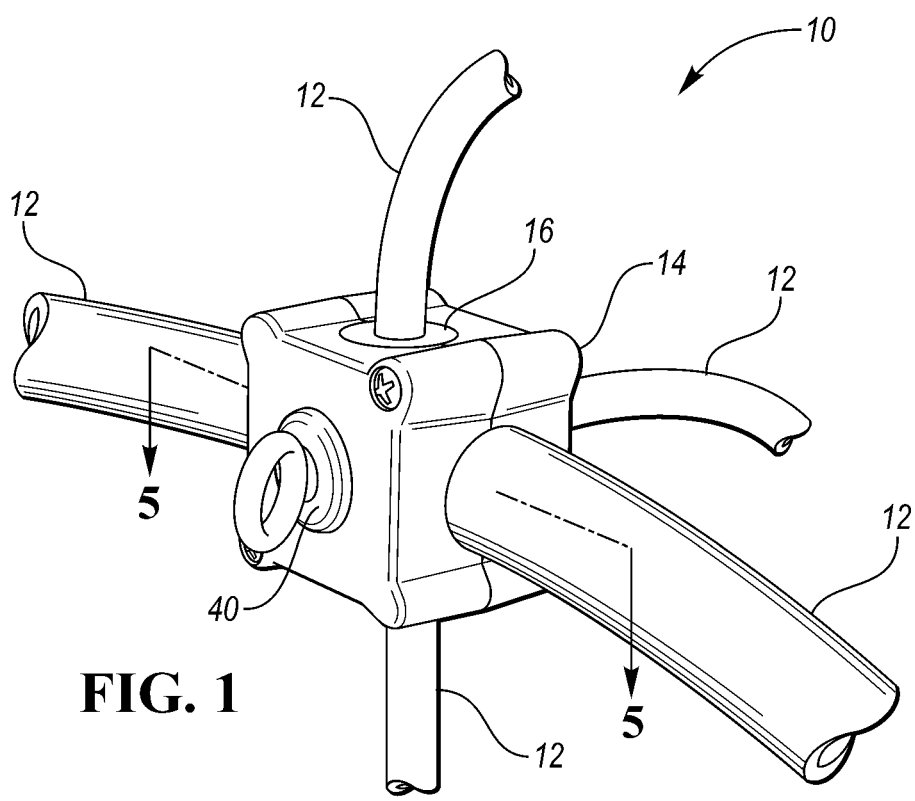
FIG. 1 is a perspective view of a system that establishes a fluid path between a plurality of tubes.

Referring to FIG. 1, a system for establishing a sealed fluid path 10 between a plurality of fluid transporting tubes 12 is illustrated. The system 10 may be utilized in a bio reactor system. The system 10 includes a manifold 14 that is utilized to connect the tubes 12 to each other in order to establish the sealed fluid path between the tubes 12. Endcaps 16 are secured to ends of each tube 12. The endcaps 16 are disposed within the manifold 14. The endcaps 16 interact with each other to establish the sealed fluid connection between the tubes 12. The plurality of tubes 12 may consist of outlet tubes and inlet tubes that transport fluid to and from other components of a larger system, such as a bio reactor system. The fluid connection between the tubes 12 may be further sealed to further prevent liquids from escaping and/or hermetically sealed to further prevent gases from escaping.

Figure 2:
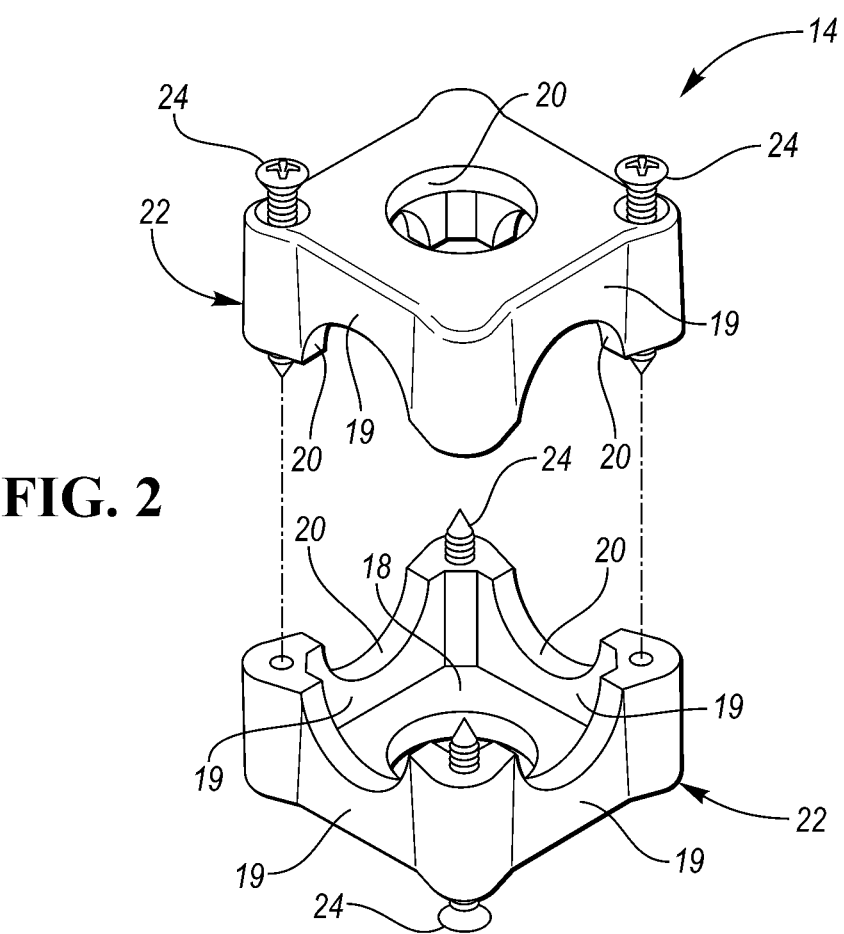
FIG. 2 is an exploded view of a manifold that is utilized to connect a plurality of tubes to each other to establish a fluid path between the tubes.

Referring to FIG. 2, an exploded view of the manifold 14 is illustrated. The manifold 14 defines an internal cavity 18 and a plurality of orifices 20 that access the cavity 18. More specifically, the orifices 20 may be defined by one of a plurality of outer walls 19 of the manifold 14. The orifices 20 may also be referred to as access orifices. The manifold 14 is comprised of multiple sub-components 22 that define the internal cavity 18 and the plurality of orifices 20 when the multiple sub-components 22 are secured to each other. The sub-components 22 may be secured to each other by fasteners 24, such as screws, bolts, rivets, clamps, or any other type of fasteners know by a person of ordinary skill in the art. The manifold 14 may function as a clamping assembly where the sub-components 22 are drawn closer to each other as the fasteners are advanced. When the clamping assembly is fully advanced such the multiple sub-components 22 are in contact with each other, the endcaps 16 may be disposed within the cavity 18 and each of the plurality of tubes 12 may extend through one of the plurality of orifices 20.

Figure 3:
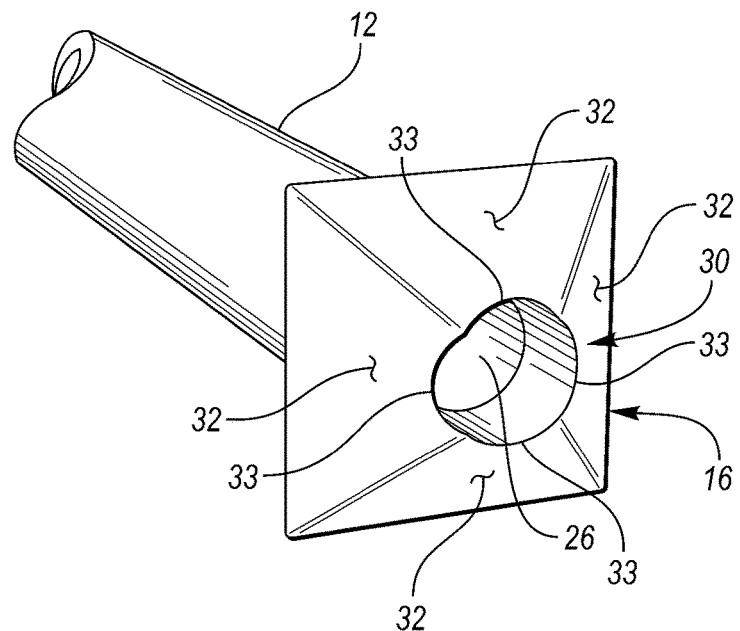
FIG. 3 is a perspective view of a tube having an endcap secured thereto.
Figure 4:
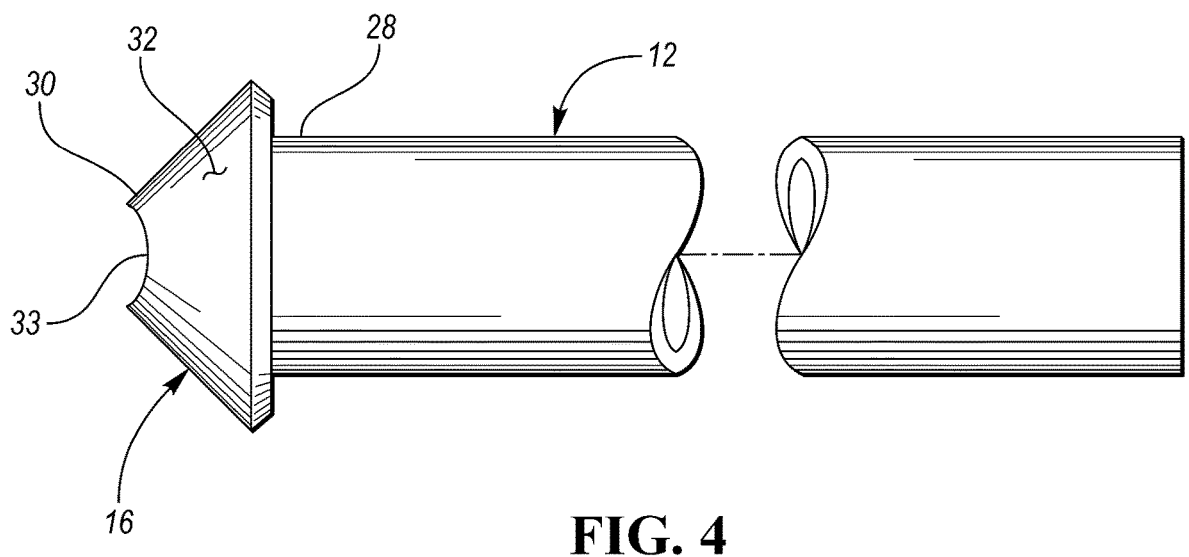
FIG. 4 is a plan view of the tube having the endcap secured thereto.

Referring to FIGS. 3 and 4, a perspective view and a plan view of a tube 12 having an endcap 16 secured thereto are illustrated, respectively. The tube 12 and endcap 16 depicted in FIGS. 3 and 4 may be representative of each of the plurality of tubes 12 and endcaps 16 that comprise the system for establishing a sealed fluid path 10. The endcap 16 defines a central orifice 26 and is secured to an end 28 of the tube 12 such that the central orifice 26 is in fluid communication with the tube 12. The endcap 16 may be secured to the end 28 of the tube 12 by a press fitting operation, an adhesive, an overmolding process (i.e., the endcap 16 is formed by a molding process over an already existing tube 12), or any other process capable of securing the endcap 16 to the tube 12 such that a seal is formed between the endcap 16 and the tube 12. The endcap 16 has a tapered protrusion 30 that extends from the endcap 16 on the opposite side of the endcap 16 relative to where the endcap 16 is secured to the end 28 of the tube 12. The tapered protrusion 30 may include four tapered surfaces 32 that form a partial tetragonal pyramid. Each tapered surface 32 may terminate along a concave ridge 33 that partially defines the central orifice 26. The concave ridges 33 define open spaces along the tips of each endcap 16 to establish fluid paths between central orifices 26 of endcaps that are disposed adjacent to each other.

Figure 5:
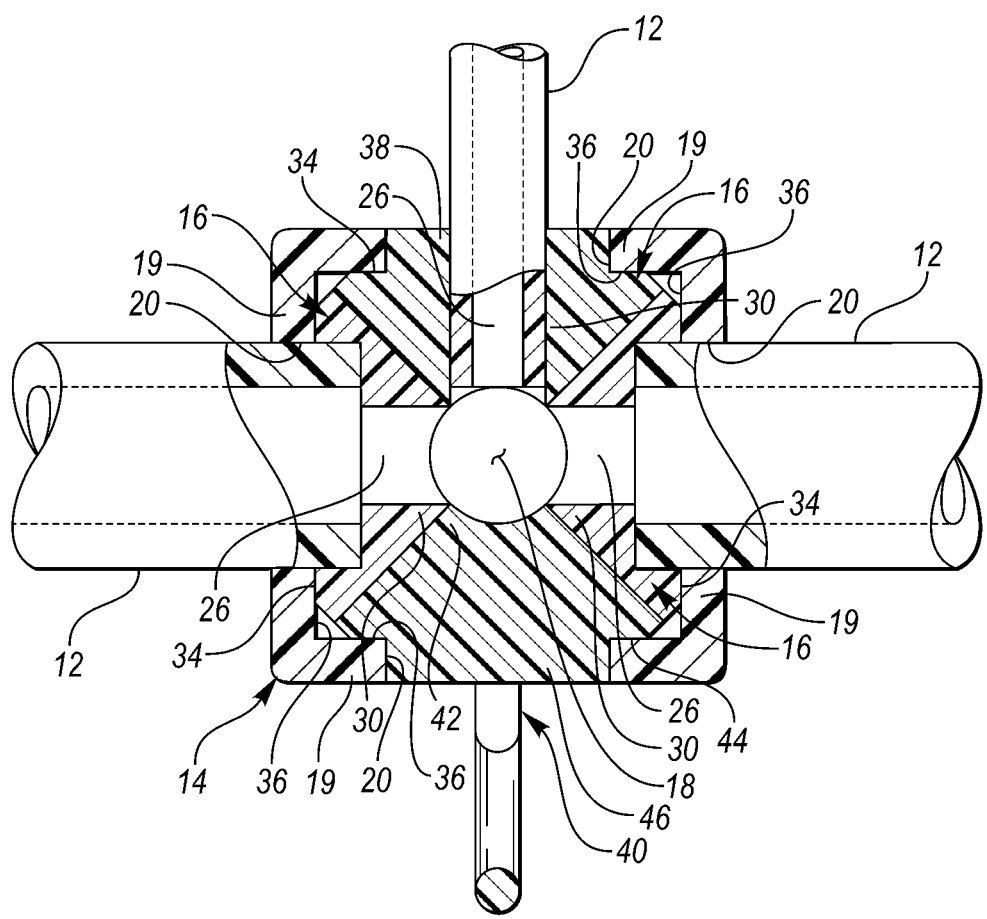
FIG. 5 is a cross-sectional view taken along line 5-5 in FIG. 1.

Referring to FIG. 5, a cross-sectional view taken along line 5-5 in FIG. 1 is illustrated. The plurality of tubes 12 are connected to the manifold 14 such that the tubes 12 are in fluid communication with each other via the internal cavity 18 defined by the manifold 14. The endcaps 16 are disposed within the internal cavity 18 such that a respective tube 12 that each endcap 16 is secured to extends through one plurality of orifices 20 and outward from the manifold 14. The tapered protrusions 30 of adjacent endcaps 16 are shaped so as to interact with each other to position the endcaps 16 to form seals with each other such that the central orifices 26 are in fluid communication with each other and isolated from the external environment. The endcaps 16 may also interact with each other to position each endcap 16 to form an additional seal between the internal cavity 18 (and/or the central orifices 26) and an adjacent respective orifice 20 of the plurality orifices 20. More specifically, each endcap 16 may have an outer surface 34 opposite the tapered protrusion 30 that engages an internal surface 36 of one of the outer walls 19 to form the seal between the internal cavity 18 and the adjacent respective orifice 20. At least one endcap 16 has a second protrusion 38 opposite the tapered protrusion 30 that extends into the respective adjacent orifice 20. The second protrusion 38 may partially define the central orifice 26 of the endcap 16. The second protrusion 38 may also function to ensure a seal is formed between the internal cavity 18 (and/or the central orifices 26) and the respective orifice 20 that is adjacent to the endcap 16. The second protrusion 38 may be desirable in instances where the respective tube 12 is sufficiently small or may be omitted in instances where the respective tube 12 is sufficiently large enough to require a step in the central orifice 26 as demonstrated in FIG. 5.

The system for establishing a sealed fluid path 10 may also include at least one plug 40 that has a second tapered protrusion 42. The second tapered protrusion 42 may also include four tapered surfaces that form a partial pyramid. The plug 40 may be disposed within the internal cavity 18 such that the tapered protrusions 30 of adjacent endcaps 16 interact with the second tapered protrusion 42 to position plug 40 to form the seal with the endcaps 16 such that the central orifices 26 are in fluid communication with each other. The plug 40 may also interact with the endcaps 16 to position each endcap 16 and the plug 40 to form the additional seal between the internal cavity 18 (and/or the central orifices 26) and the respective orifice 20 defined by the manifold 14 that is adjacent to each endcap 16 or plug 40. More specifically, each plug 40 may have an outer surface 44 opposite the second tapered protrusion 42 that engages an internal surface 36 of one of the outer walls 19 to form the seal between the internal cavity 18 and the adjacent respective orifice 20. The plug 40 may also have an additional protrusion 46 opposite the second tapered protrusion 42 that extends into the respective adjacent orifice 20. The addition protrusion 46 may also function to ensure a seal is formed between the internal cavity 18 (and/or the central orifices 26) and the respective orifice 20 that is adjacent to the plug 40.

The endcaps 16, plugs 40, tubes 12, and manifold 14 may each be made from a rubber or plastic material, including thermoplastics and thermoset plastics. The endcaps 16 and plugs 40 may be made from an elastic plastic material so that endcaps 16 and plugs 40 have sufficient flexibility to form seals between adjacent endcaps 16, adjacent plugs 40, and the manifold 14. The manifold 14 may be made from more rigid material, such as a hard plastic or metal, to provide sufficient structure to house the endcaps 16 and/or plugs 40, and to generate a sufficient clamping force, when the sub-components 22 are secured to each other, to position the endcaps 16 and/or plugs 40 into contact with each to form seals.

Although the system 10 is depicted as having a manifold 14 that defines six access orifices 20 and the endcaps 16/plugs 40 are depicted as having tapered protrusions with four tapered surfaces, it should be understood that the number of access orifices into the manifold and the number of tapered surfaces of each tapered protrusion of each endcap/plug may be adjusted based on the desirable design parameters. Therefore, this disclosure should be construed to include manifolds that define any number of access orifices and to include endcaps/plugs that include tapered protrusions that have one or more tapered surfaces that engage adjacent endcaps/plugs to form seals between the adjacent endcaps/plugs and/or the manifold.

Figure 6:
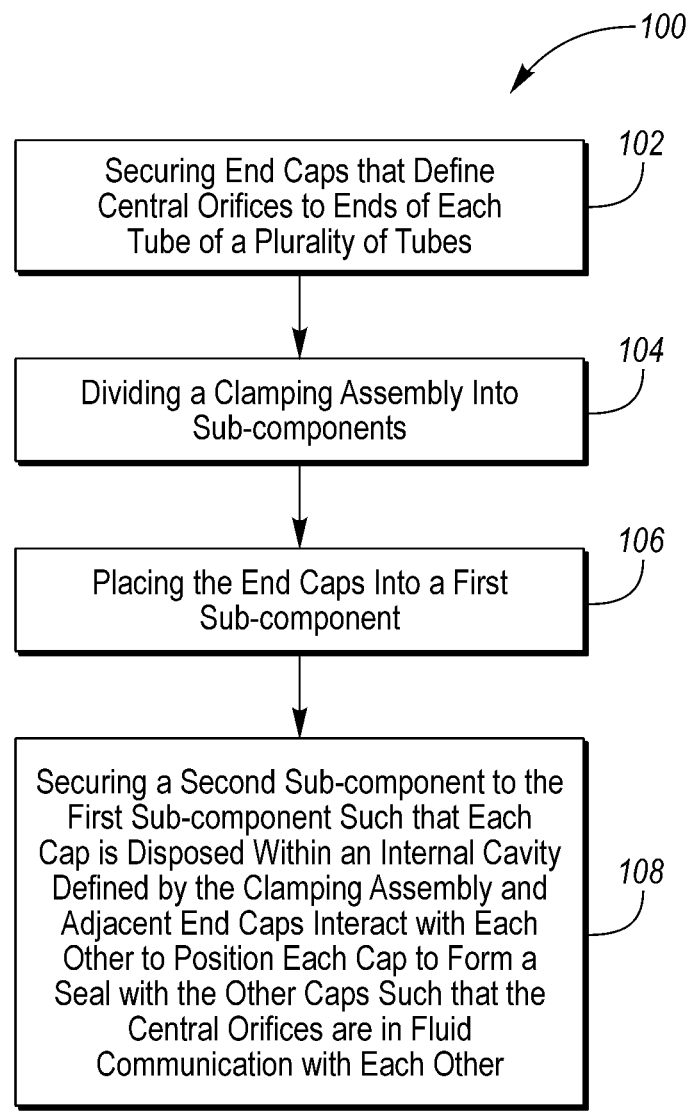
FIG. 6 is a flowchart depicting a method for establishing a fluid connection between a plurality of tubes.

Referring to FIG. 6, a flowchart depicting a method 100 for establishing a fluid connection between a plurality of tubes 12 is illustrated. The method 100 begins at step 102. At step 102, the endcaps 16 that have tapered protrusions 30 and define central orifices 26 are secured to the ends 28 of each tube 12 such that the tapered protrusions 30 extend away from the tubes 12 and the central orifices 26 fluidly communicate with the tubes 12. After the endcaps 16 are secured to the tubes 12, the method 100 moves on to step 104 where the manifold (or clamping assembly) 14, that defines the internal cavity 18 and the plurality of orifices 20, is divided into first and second sub-components 22. The endcaps 16 are then placed into a portion of the first sub-component 22 that at least partially defines the internal cavity 18. Once the endcaps 16 have been placed into the first sub-component 22, the method moves on to step 108, where the second sub-component 22 is secured to the first sub-component 22 such that each endcap 16 is disposed within the internal cavity 18, each tube 12 extends from the internal cavity 18 through one of the plurality orifices 20, the tapered protrusions 30 of adjacent endcaps 16 interact with each other to position each endcap 16 to form a seal with other endcaps 16 that define central orifices 26 such that the central orifices 26 are in fluid communication with each other.

The endcaps of the tubing may be provided by a convenient method. If the tubing is thermoplastic, it is possible to heat the end of the tubing and mold the end of the tube appropriately. However, it is preferred that the endcaps be overmolded onto the tube. For this purpose, a suitable injection mold may be used. A metal or other rod insert may be inserted into the end of the tubing to prevent its collapse. Since the distal end of the endcap/tube is open, such rods may easily be removed, and furthermore are only required to be relatively short. The endcaps can also be molded onto metal tubes, which can likewise be connected through use of the invention. In this case, no rod insert may be needed while molding the endcaps. A mixture of metal and plastic tubes may also be used.

The plastic tubes may comprise any tubing useful, including tubing made of polyolefins such as polyethylene, polyproplylene, copolymers of ethylene, propylene, or their mixtures with higher olefins, polyvinylchloride, polybutadiene/styrene copolymers, copolymers of one or more other addition-polymerizable monomers such as (meth)acrylates, vinyl esters, and the like, with or without olefin comonomers, polyvinyl acetals, polyurethanes, polyureas, and the like. The hardness of the plastic tubing is not limiting, and may range from a low hardness on the Shore A durometer scale, for example Shore A 20 to 40, to a hardness on the Shore D scale, for example Shore D 55. Tubing having hardness on the Shore A scale is preferred.

For metal tubing, all metal tubing is useful, for example that of copper, brass, steel, titanium, stainless steel, and the like.

The endcaps may be of thermoplastic or thermoset materials. The hardness of the endcaps is not overly critical, provided that they are sufficiently deformable so as to seal against one another. Thus, endcaps on the Shore A durometer scale are preferred, preferably Shore A 20 to Shore A 95, more preferably Shore A 20 to Shore A 65. With more robust manifolds, in general, a higher Shore A hardness will be suitable. The endcaps may be made of the same types of polymers as the tubing, optionally having a different hardness, but may also be made of thermoset materials such as, but not limited to, elastomeric thermoset polyurethanes, epoxy resins, light-activated addition polymers, polyorganosiloxanes, and the like.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A system for establishing a fluid path between a plurality of tubes comprising:
   a manifold that defines an internal cavity and a plurality of orifices that access the cavity; and
   a plurality of caps each secured to an end of a respective tube of the plurality of tubes, each cap defining a central orifice in fluid communication with the respective tube and having a tapered protrusion extending away from the end of the respective tube, wherein the caps are disposed within the internal cavity such that the respective tube extends through a respective orifice of the plurality of orifices and outward from the manifold, wherein the tapered protrusions of adjacent caps are shaped so as to directly contact and interact with each other to position each cap within the manifold and to form a seal with other caps such that the central orifices are in fluid communication with each other, wherein each of the tapered protrusions of each cap includes a plurality of tapered surfaces, and wherein each tapered surface directly contacts and interacts with one of the tapered surfaces on one of the adjacent caps to form the seal with other caps.

2. The system of claim 1, wherein the manifold is divisible into multiple sub-components that form a clamping assembly that is configured to force the tapered protrusions of adjacent caps into direct contact with each other, wherein the clamping assembly defines the internal cavity and the plurality of orifices.

3. The system of claim 2, wherein the multiple sub-components are secured to each other via fasteners.

4. The system of claim 1, wherein the caps interact with each other to position each cap to form a second seal between the internal cavity and the respective orifice.

5. The system of claim 4, wherein the manifold includes outer walls that define the plurality of orifices and each cap has an outer surface opposite the tapered protrusion that engages an internal surface of one of the outer walls to form the second seal between the internal cavity and the respective orifice.

6. The system of claim 1, wherein at least one cap has a second protrusion opposite the tapered protrusion that extends into the respective orifice of the plurality of orifices and partially defines the central orifice.

7. The system of claim 1, wherein the tapered protrusion of each cap has four tapered surfaces that form a partial pyramid.

8. The system of claim 1, wherein each cap is overmolded onto each respective tube such that a second seal is formed between each cap and the respective tube.

9. The system of claim 1 further comprising a plug having a tapered protrusion, the plug disposed within the internal cavity such that the tapered protrusions of adjacent caps interact with the tapered protrusion of the plug to position the plug to form the seal with the caps.

10. The system of claim 9, where the plug is disposed within the internal cavity such that the tapered protrusion of an adjacent cap interacts with the tapered protrusion of the plug to position the plug to form a second seal between the internal cavity and one of the plurality of orifices.

11. The system of claim 10, wherein the manifold includes outer walls that define the plurality of orifices and the plug has an outer surface opposite the tapered protrusion of the plug that engages an internal surface of one of the outer walls to form the second seal between the internal cavity and one of the plurality of orifices.

12. The system of claim 10, wherein the plug has a third protrusion opposite the tapered protrusion of the plug that extends into the one of the plurality of orifices.

13. A bio reactor system having,
a plurality of fluid transporting tubes that are connected to a manifold such that they are in fluid communication with each other via an internal cavity defined by the manifold,
wherein the improvement comprises securing caps that have tapered protrusions and define central orifices to ends of each tube such that the tapered protrusions extend away from the tubes and the central orifices fluidly communicate with the tubes, wherein each cap is disposed within the internal cavity such that each tube extends from the internal cavity through one of a plurality of access orifices defined by one of a plurality of outer walls of the manifold, the tapered protrusions of adjacent caps are shaped so as to directly contact and interact with each other to position each cap and to form a seal with other caps such that the central orifices are in fluid communication with each other, wherein each of the tapered protrusions of each cap includes a plurality of tapered surfaces, and wherein each tapered surface directly contacts and interacts with one of the tapered surfaces on one of the adjacent caps to form the seal with other caps.

14. The system of claim 13, wherein the manifold is divisible into multiple sub-components that form a clamping assembly that is configured to force the tapered protrusions of adjacent caps into direct contact with each other, wherein the clamping assembly defines the internal cavity and the plurality of access orifices.

15. The system of claim 13, wherein at least one cap has a second protrusion opposite the tapered protrusion that extends into one of the plurality of access orifices and partially defines the central orifice.

16. The system of claim 13, wherein the tapered protrusion of each cap has four tapered surfaces that form a partial pyramid.

17. The system of claim 13, wherein the caps are overmolded onto the ends of each tube.

18. The system of claim 13 further comprising a plug having a tapered protrusion, the plug disposed within the internal cavity such that the tapered protrusion of an adjacent cap interacts with the tapered protrusion of the plug to position the plug to form the seal with the caps.

19. The system of claim 18, wherein the plug has a third protrusion opposite the tapered protrusion of the plug that extends into one of the plurality of access orifices.

* * * * *